Patented July 2, 1946

2,403,314

UNITED STATES PATENT OFFICE 2,403,314

HYDROCARBON ISOMERIZATION PROCESS

Carl O. Tongberg, Westfield, N. J., assignor to Standard Oil Development Company, a corporation of Delaware No Drawing. Application August 15, 1941,
Serial No. 406,937

14 Claims. (Cl. 260—683.5)

The present invention relates to a process of isomerizing normal or straight chain paraffins containing at least 4 carbon atoms per molecule to produce their corresponding iso or branched chain paraffinic isomers. The invention is likewise applicable to the transformation of branched chain paraffins to correspondingly more highly branched chain paraffins. However from the commercial standpoint the greatest value of the invention resides in the production of branched chain paraffins which are more desirable than the corresponding normal paraffins. The products of the reaction find utility as reactants in their alkylation with olefins to produce motor and aviation fuel hydrocarbons or in their direct addition to fuels as blending agents in order to produce a balanced volatility for such fuels.

It is known that normal paraffins may be isomerized by various Friedel-Crafts type catalysts such as the metal halides, for example the chlorides and bromides of aluminum, iron, zinc, and the like with or without the use of promoters, as for example the hydrogen halides, such as hydrogen chloride and hydrogen bromide, or free halogens, for example chlorine or bromine; compounds such as, for example the alkyl halides or polyhalides such as carbon tetrachloride, ethyl chloride, the propyl halides, the butyl chlorides and bromides or water, particularly this latter promoter being used where aluminum chloride is employed as the catalyst. The various catalysts heretofore set forth vary in their activity considerably depending not only on the catalyst itself but also depending on the reaction conditions and the particular feed stock being isomerized. Furthermore, particularly when using the Friedel-Crafts type catalyst, after some length of usage of the same in an isomerization reaction of the type heretofore described, the catalysts tend to become less active and selective in their action and unless great care is taken to control the reaction conditions, a substantial amount of cracking may occur, which, of course, results in a decreased yield of the desired isomeric branched chain paraffinic compounds being produced.

The process of the present invention embodies the discovery that the activity of Friedel-Crafts type catalysts, particularly the aluminum halides such as for example aluminum chloride or aluminum bromide, when catalyzing the isomerization of paraffinic hydrocarbons containing at least 4 or 5 carbon atoms per molecule, may be further increased by the addition of organic sulfides to the feed stock or to the catalyst prior to or simultaneously with the introduction of the feed stock to the reaction zone. These organic sulfides are found to be promoters for the aluminum halide. They may also be employed in conjunction with the other well-known promoters heretofore mentioned as being useful in connection with aluminum halides for isomerizing normal paraffins to isoparaffins.

It has been found that not all organic sulfur compounds are effective as promoters for use in the isomerization of normal paraffins to isoparaffins in the presence of the Friedel-Crafts type catalyst and that certain sulfur compounds are actually harmful. For example, diamyl sulfide, normal dibutyl sulfide, diisobutyl sulfide, normal dipropyl sulfide, diisopropyl sulfide, diethyl sulfide and dimethyl sulfide are effective in increasing the activity of aluminum chloride whereas low boiling mercaptans and thiophene reduce its activity. Certain of the higher alkyl mercaptans have no marked effect on the activity of aluminum chloride.

It is within the contemplation of the present invention to employ not only the monosulfides heretofore set forth, but also the disulfides and trisulfides as well. For example, diamyl disulfide and diamyl trisulfide have been found to be useful as promoters according to the present process. Likewise their corresponding propyl and butyl homologues may also be employed.

The amounts of the various sulfides heretofore set forth to be employed as promoters in the reaction may vary to some extent, although it is preferred to employ relatively small amounts of these compounds in the isomerization reaction. For example, the amount of organic sulfide employed may vary between about 0.05% or even less up to as high as 5% or even more, based on the amount of Friedel-Crafts catalyst present in the reactor at any one time. However, the preferred range resides in the use of quantities between about 0.1 and about 0.5% based on the aluminum halide employed.

As feed stocks to be customarily employed in the isomerization reaction, straight chain paraffins containing at least 4 to 5 carbon atoms to the molecule are used. Thus, normal butane, normal pentane, normal hexane, normal heptane, and higher homologues thereof are the preferred feed stocks. In general, however, for the most economical results, the lower members heretofore mentioned are customarily employed since their tendency toward cracking while undergoing isomerization is considerably less than the higher members. Likewise secondary normal heptane may be employed in order to produce tertiary or iso-heptane. The cracking tendency heretofore referred to may to some extent be suppressed by the introduction of a superatmospheric pressure of free or elemental hydrogen during the reaction. Usually it is desirable that the presence of free or elemental hydrogen be kept at a minimum amount yet at the same time sufficient to accomplish the desired suppression of cracking. However, large quantities may be employed if available and desirable, although the equipment employed necessarily has to be constructed of heavier material to withstand the greater superatmospheric pressure. Mixtures of two or more of the above-mentioned paraffins or paraffinic mixtures predominating in straight chain paraffins although some isoparaffins may be present, are equally suitable stocks to be produced according to the present invention.

Where the acyclic sulfides are normally found to be present in the feed stock employed in the process of the present invention it may be necessary to pretreat the feed with, for example, concentrated sulfuric acid in order to remove the sulfides so that they may be readded at a constant rate in order to maintain a definite constant amount in the reaction zone. It is not necessary of course that the same sulfur compounds removed from the feed stock be reintroduced therein. Suitable compounds heretofore mentioned from other sources may be employed in place of those removed. If desired the sulfides can be added directly to the reaction mixture or they may be first added to the feed stock going into the reaction mixture. In some instances, removal of all sulfur compounds from the feed may be desirable to eliminate the injurious effect of certain types of sulfur compounds, and the preferred type namely the organic sulfides readded.

The reaction conditions are those customarily employed when carrying out paraffinic isomerization reactions in the presence of the usual Friedel-Crafts type catalyst, for example aluminum chloride or aluminum bromide. The quantity of metal halide employed may range in liquid phase operation between about 15 and 150% by weight of the hydrocarbon present in the reactor at any one time. In vapor phase operation the amount of catalyst may be much higher. The optimum catalyst concentration may vary considerably depending upon the reaction conditions and feed stock employed. Ordinarily lower catalyst concentrations are employed at relatively high temperatures and longer reaction times. Under typical liquid phase operating conditions the amount of catalyst present ranges from between about 15 and about 100%. The promoters heretofore mentioned other than the organic sulfides, that is the halogen compounds and/or water, may be employed in an amount ranging between about 1 and about 25% by weight of the hydrocarbon present in the reactor at any one time, preferably, however, between about 4 and about 15%. The temperature under which the reaction is carried out is to an appreciable extent dependent upon the feed stock employed, the amount of catalyst present, the amount of promoters present and also the length of time during which the feed stock is subjected to the reaction conditions. Thus, for example when isomerizing normal butane in liquid phase operation the temperature of the reaction zone may be maintained conveniently between about 60° and about 300° F. preferably about 100° and about 225° F. In vapor phase operation the temperature of the reaction zone may be maintained at between about 150° and about 500° F., preferably between about 275° and about 375° F. However, when employing normal pentane as the feed stock all other reaction conditions remain substantially the same, the temperature preferred is somewhat lower than in the case of normal butane because of the increased tendency of normal pentane to crack at the higher temperatures. The reaction may be carried out batch-wise or in continuous flow equipment with a contact time of roughly between 0.1 and about 20 hours, preferably between about 2 and about 15 hours depending, of course, upon the other reaction conditions obtained for liquid phase operation and between about 15 seconds and about 15 minutes in vapor phase operation, preferably between about 20 seconds and about 3 minutes. Where reaction conditions are more severe and the tendency towards cracking is greater, shorter contact times are required even when hydrogen is used to suppress cracking; lower temperatures and larger amounts of promoters and catalyst concentrations being allowable when using longer contact times.

The use of superatmospheric pressure has heretofore been mentioned in connection with the use of elemental or free hydrogen to suppress cracking. Superatmospheric pressures may be employed however even when no elemental or free hydrogen is used when it is desirable. Likewise specified amounts of many of the promoters employed under the temperatures of the reaction require the use of closed pressure vessels in order to maintain their presence in the reaction zone. Hence at all times some superatmospheric pressure may be developed in situ. Pressures range up to as high as 1000 lbs. per square inch gauge may be maintained, although generally pressures of this order of magnitude are not necessary.

Single or multiple reactors arranged in series or parallel may be employed. The mechanical means for agitating the reactant mixture in liquid phase operation may be orifice mixers such as jets of restricted internal diameter, motor driven propellers, turbo mixers or the like or beds of catalyst may be employed wherein the Friedel-Crafts catalyst is deposited on a carrier mixed with sand or other inert material or employed in the form of powder or lumps and the feed stock is flowed therethrough in a continuous type of system. The customary catalytic reactors, fractionating towers, pumps, valves and the like are suitable for the construction of the equipment for this process. The designs of units for operating the process are well known and need not be presented herein in detail.

In order to more fully describe and disclose the character of the invention the following examples are given. However it is distinctly understood that these examples are merely illustrative of the invention and it is not intended that the invention be limited thereby.

*Example 1*

There was charged to a shaking bomb 150 grams of normal pentane, 150 grams of aluminum chloride, 9.4 grams of hydrogen chloride, and 0.15 gram of diamyl sulfide. The temperature of the bomb was maintained at about 75° F. and the bomb was shaken vigorously for about three hours at the end of which time a reaction product was obtained which contained 50% of isopentane with practically no cracking having occurred. In a run carried out at the same conditions in the absence of diamyl sulfide a yield of only 35% of isopentane was obtained. Under similar conditions the addition of 0.5% ethyl mercaptan gave only 7% isopentane.

Example 2

A run was made in exactly the same manner using the same feed stock, etc., as in Example 1, except that 38.5 grams of hydrogen chloride were employed, about 0.3 gram of diamyl sulfide were employed, and the run was carried out for a period of about two hours at the end of which time the reacted mixture showed 67% of isopentane produced from 70% of the normal pentane charged, indicating a selectivity of 96% of the normal pentane undergoing reaction having gone to isopentane. In an experiment carried out under identical conditions with no diamyl sulfide employed, the product contained only about 44% of isopentane.

Example 3

A series of runs were carried out using in each 150 grams of normal pentane, 150 grams of aluminum chloride, about 3% of hydrogen chloride based on the normal pentane charged, the reactor being maintained at 75° F. and the reaction time in each experiment being about three hours. Two separate sulfur compounds were employed in each of the three experiments conducted under these conditions and in each case about 0.75 gram of each of the addition agents were employed. The reaction products indicated that the following percentages of normal pentane had reacted to isopentane.

| Example | Addition agent | Percent normal pentane reacted |
|---|---|---|
| 3a | Normal butyl sulfide | 64 |
| 3b | Diamyl trisulfide | 40 |

It is apparent from the above examples that the activity of the Friedel-Crafts catalysts is materially enhanced so far as the production of isoparaffins is concerned by employing the organic sulfur compounds of the type heretofore specified as promoters or addition agents in the isomerization reaction.

Having thus fully described the character of the invention, what is claimed as new and useful and desired to be secured by Letters Patent is:

1. A process which comprises isomerizing at least one paraffin containing at least 4 carbon atoms per molecule under isomerization reaction conditions while in contact with a Friedel-Crafts type catalyst and in the presence of at least one alkyl sulfide.

2. A process which comprises isomerizing at least one paraffin containing at least 4 carbon atoms per molecule under isomerization reaction conditions while in the presence of at least one aluminum halide and at least one compound taken from the group consisting of alkyl mono, di and tri sulfides.

3. A process which comprises isomerizing at least one normal paraffin containing at least 4 carbon atoms per molecule under isomerizing reaction conditions while in contact with an aluminum halide, in the presence of promotional amounts of at least one alkyl sulfide and a halogen-containing promoter.

4. A process as in claim 3 wherein the reaction is carried out substantially in the vapor phase.

5. A process as in claim 3 wherein the reaction is carried out in the presence of molecular hydrogen.

6. A process of isomerizing normal butane to isobutane which comprises contacting normal butane with aluminum chloride and a hydrogen halide under isomerization reaction conditions in the presence of a small amount of an alkyl sulfide.

7. A process which comprises isomerizing normal pentane to isopentane which comprises contacting normal pentane under isomerizing reaction conditions in the presence of aluminum chloride, hydrogen halide, and a small amount of an alkyl sulfide.

8. A process which comprises contacting normal pentane under isomerizing reaction conditions in the presence of aluminum chloride, hydrogen chloride, and a diamyl sulfide, and recovering isopentane from the reaction product.

9. A process which comprises contacting normal butane under isomerizing reaction conditions with aluminum chloride, hydrogen chloride, and a diamyl sulfide and recovering isobutane from the reaction product.

10. A process which comprises contacting normal pentane at a temperature of about 75° F. for a period of about 2 to about 3 hours in the presence of between about 2 and about 22% of hydrogen chloride and between about 15 and 150% by weight of aluminum chloride while in the presence of between about 0.05 and about 5.0% of a compound taken from the group consisting of alkyl mono, di and tri sulfides.

11. A process which comprises reacting normal pentane in the presence of 100% of aluminum chloride, between about 4 and about 22% of hydrogen chloride at a temperature between about 40 and 75° F. for a period of time sufficient to effect substantial isomerization and in the presence of between about 0.1 and about 0.5% of a diamyl sulfide.

12. A process as in claim 11 wherein the diamyl sulfide is replaced by a diamyl trisulfide.

13. Process as in claim 11 wherein the diamyl sulfide is replaced by normal butyl sulfide.

14. A process which comprises isomerizing at least one paraffin containing at least 4 carbon atoms per molecule under isomerization reaction conditions while in contact with an aluminum halide catalyst and in the presence of at least one alkyl mono-sulfide.

CARL O. TONGBERG.